Figure 1:
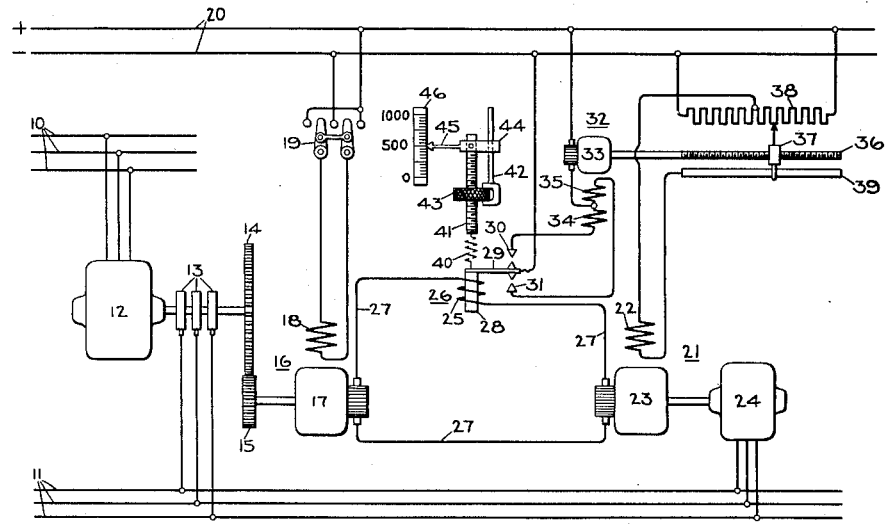

May 29, 1934. R. F. FRANKLIN 1,961,039

CONTROL OF POWER TRANSFERRING APPARATUS
Filed March 30, 1933

Inventor:
Raymond F. Franklin,
by Chas. E. Tullar
His Attorney.

Patented May 29, 1934

1,961,039

UNITED STATES PATENT OFFICE 1,961,039

CONTROL OF POWER TRANSFERRING APPARATUS

Raymond F. Franklin, Scotia, N. Y., assignor to General Electric Company, a corporation of New York Application March 30, 1933, Serial No. 663,537

16 Claims. (Cl. 172—281)

My invention in its broad aspect relates to the control of power transferring apparatus. More specifically, it is an object of my invention to provide control apparatus that will automatically maintain any desired value of energy transfer through power transferring apparatus. At present I believe that the most important practical application of my invention is with an induction frequency converter interconnecting two alternating current systems for transferring energy from one to the other of the two systems. Accordingly, my invention will be described in connection with the provision of control apparatus for such a converter for automatically maintaining any desired value of energy transfer therethrough from one to the other of the two alternating current systems irrespective of variations in their frequencies. However, I wish it clearly understood that my invention is not limited to this specific use.

It is oftentimes desirable to transfer an adjustable but constant value of energy from one to the other of the two alternating current systems. This can be accomplished by employing an induction frequency converter interconnecting the two systems and a control arrangement for exerting an adjustable value of torque on the rotor element of the converter, as shown for example in U. S. Patent No. 1,637,863, Jump, August 2, 1927, assigned to the assignee of this application. In this power transferring arrangement the value of energy transferred from one to the other of the two alternating current systems changes every time there is a change in their relative frequencies. This makes it necessary to readjust the control apparatus every time this occurs if it is desired to maintain the energy being transferred at a substantially constant value. This is an impractical thing to do because the relative frequencies of the two systems are varying almost all the time. It therefore became desirable to provided a control arrangement which would automatically maintain a predetermined value of energy flow from one to the other of the two systems irrespective of ordinary variations in their relative frequencies.

My invention provides such a control arrangement. Briefly described, it consists of an energy translating device, such as a dynamo electric machine, having a rotatable shaft mechanically coupled to the rotor element of the induction frequency converter for exerting a torque thereon. The operation of this dynamo electric machine as a motor or as a generator and the amount of energy that must be supplied thereto or that is supplied thereby for a given value of energy transfer through the converter depends on the relative frequencies of the two alternating current systems. Associated with this dynamo electric machine are suitable energy translating means, such as another dynamo electric machine, for supplying electrical energy thereto or consuming electrical energy supplied thereby. I also provide adjusting means for varying the amount of electrical energy flowing to or from the first mentioned dynamo electric machine and a control element responsive to this energy flow for automatically controlling the operation of the adjusting means so as to maintain a substantially constant value of torque in a given direction on the rotor element of the frequency converter. This automatically maintains the energy transfer through the converter at a substantially constant value irrespective of ordinary variations in the frequencies of the two alternating current systems.

My invention, however, will be best understood from the following description, when considered in connection with the accompanying drawing, while those features of my invention which are believed to be novel and patentable are pointed out in the appended claims.

Figure 2:
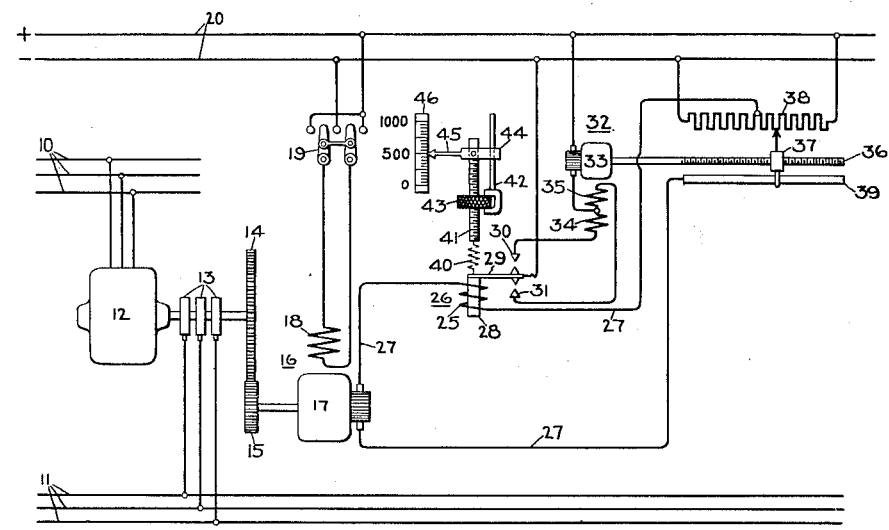

Fig. 1 of the drawing represents a preferred embodiment of my invention, whereas Fig. 2 represents a modification thereof. Similar elements in both figures are represented by the same reference characters.

In Fig. 1, let 10 and 11 represent two alternating current three phase systems. An asynchronous machine 12 has relatively rotatable primary and secondary windings, either of which may be connected to system 10 and the other connected to system 11. Thus, for example, machine 12 has a stationary primary winding connected to system 10, and a rotatable secondary winding connected through its collector rings 13 to system 11. A large gear 14 is secured to the rotor shaft of machine 12, this gear meshing with a pinion 15 secured to the shaft of a direct current type dynamo electric machine 16. Machine 16 has a rotatable commutated armature winding 17 and a stationary field winding 18 which may be connected through a reversing switch 19 to a direct current source 20. Another direct current type dynamo electric machine 21 has a stationary field winding 22 and a rotatable commutated armature winding 23 which is mechanically coupled, for example, to an asynchronous dynamo electric machine 24 whose primary winding is connected to system 11. Armature windings 17 and 23 are electrically connected in series with each other and in series with a stationary coil 25 of a solenoid 26 by means of leads 27. Coil 25 surrounds a movable magnetic core 28 to which is secured a contact arm 29. Two stationary contacts 30 and 31 are respectively disposed on opposite sides of contact arm 29, these contacts being so positioned that when core 28 is in its normal position arm 29 does not touch either of these contacts, but when the core moves slightly upward from its normal position arm 29 touches contact 30 and when the core moves slightly downward from its normal position arm 29 touches contact 31. By the normal position of core 28 I mean the position it would naturally assume when coil 28 is energized to exert sufficient magnetic force on the core to overcome the force of gravity thereon and there are no other forces exerted on the core.

A direct current motor 32 has a rotatable commutated armature winding 33 and two stationary field windings 34 and 35. One end of each of windings 34 and 35 is connected in series with armature winding 33 to one line of source 20, whereas the other line of this source is connected to contact arm 29, and the remaining ends of windings 34 and 35 are connected to contacts 30 and 31 respectively. The above connections are so arranged that when arm 29 touches contact 30 armature 33 and field winding 34 are so energized that the armature rotates in one direction, whereas when arm 29 touches contact 31 armature 33 and field winding 35 are so energized that the armature rotates in the opposite direction. Armature 33 has a threaded shaft 36 on which is screwed a threaded contact arm 37 having one end thereof adapted to slide on a resistance 38 which is connected across source 20, and having its other end in electrical contact with a metallic rod 39. Rod 39 and that end of contact arm 37 which engages the rod are so arranged that the rod prevents the contact arm from rotating when armature 33 rotates in either direction. Hence, rotation of armature 33 in one direction causes contact arm 37 to slide towards the right over resistance 38 and rotation of the armature in the opposite direction causes the contact arm to slide towards the left over this resistance. One end of field winding 22 of machine 21 is connected to the center of resistance 38 and the other end of this field winding is connected to rod 39. When contact arm 37 is at the center of resistance 38 no current flows in winding 22, when the contact arm is to one side of the center of the resistance current flows in one direction through winding 22, and when the contact arm is to the other side of the center of the resistance current flows in the opposite direction through winding 22. It should now be clear that by rotating armature 33 of motor 32 the magnitude of the current flowing in winding 22 can be varied from maximum value in one direction down to zero and up to maximum value in the opposite direction, and vice versa. One end of a helical spring 40 is secured to contact arm 29 and its other end is secured to the lower end of a threaded rod 41. A guide member 42 has its lower end notched with the opposite sides of the notch slidably engaging the opposite sides of a knurled internally threaded nut 43 which is screwed on rod 41. Guide member 42 has an upwardly extending arm which passes through a clearance hole in an arm 44 which is secured to the upper end of rod 41. Secured to arm 44 is an indicating pointer 45 which is adapted to sweep over a stationary graduated scale 46. It should now be clear that nut 43 can not move vertically but can be rotated, whereas pointer 45 can move vertically but can not rotate, and that by turning the nut in one direction the pointer moves upward and the tension of spring 40 is increased, and that by turning the nut in the opposite direction the pointer moves downward and the tension of spring 40 is decreased.

A clear understanding of the operation of the apparatus illustrated in Fig. 1 will be facilitated by first giving the following explanation: When two A. C. systems of like frequency and voltage are tied together directly through a tie line, they operate in synchronism and exchange power so long as the phase angle between the voltages of the two systems does not become too great. The amount of power transferred from one system to the other increases with an increase of the phase angle between their voltages and decreases with a decrease of this phase angle. The same action occurs when a transformer is used in the tie line between two systems of different voltages and like frequency. The asynchronous machine 12 in Fig. 1 may be considered as a general transformer tying together systems 10 and 11. Assuming, for the sake of simplicity, that the stator and rotor windings of machine 12 have the same number of poles, then, when systems 10 and 11 have the same frequency, the rotor of machine 12 is stationary and the machine functions like an ordinary transformer tying together two systems of like frequency. However, since the rotor of machine 12 can revolve it is possible to have this machine tie together two systems whose frequencies are always different, or two systems whose basic frequencies are the same, but either or both of which vary in frequency, and to transfer a desired amount of power from one to the other of the two systems. In this case machine 12 functions both as a transformer and frequency changer.

The speed and direction of rotation of the rotor of machine 12 is independent of the amount of energy transferred through the machine, and only depends on the relative number of poles in its stator and rotor windings, and on the relative frequencies of systems 10 and 11. I have already assumed for the sake of simplicity that the stator and rotor windings of machine 12 have the same number of poles. For the same reason I will assume that the normal frequency of systems 10 and 11 is 60 cycles per second. The stator and rotor windings of machine 12 should be so connected to their respective systems that the stator and rotor fluxes revolve in the same direction, and I will assume that this has been done. Let us now assume that systems 10 and 11 are now operating at the same frequency, for example, 60 cycles. The rotor of machine 12 will then be stationary since the stator and rotor fluxes revolve in the same direction and at the same speed relative to the air gap between the stator and rotor. If now the frequency of system 10 increases or the frequency of system 11 decreases, or both occur, then the rotor of machine 12 will revolve in a given direction and at such a speed so that its flux will revolve in the same direction and at the same speed relative to the previously described air gap as the stator flux. If, on the other hand, the frequency of system 10 decreases or the frequency of system 11 increases, or both occur, the rotor of machine 12 will revolve in the opposite direction and at such a speed so that its flux will resolve in the same direction and at the same speed relative to the previously mentioned air gap as the stator flux.

In order to transfer energy through machine 12 from one to the other of systems 10 and 11, it is necessary to exert a torque on the rotor of the machine in addition to the inherent torque it has for rotating in the proper direction and speed as previously described. This inherent rotor torque will be neglected as it is immaterial to the description of my invention, and only the torque exerted on the rotor will be discussed. The amount of energy transferred by machine 12 from one to the other of systems 10 and 11 is controlled by regulating the amount of torque exerted on the rotor of the machine, whereas the direction in which this energy is transferred is controlled by exerting this torque in the proper direction. Thus, assume that no torque is exerted on the rotor of machine 12 and that systems 10 and 11 have the same frequency. The rotor will then be stationary and will assume such a position that its magnetic axis coincides with that of the stator whereby there will be no phase angle between the voltages of systems 10 and 11, and, therefore, there will be no transfer of energy through machine 12 from one to the other of the two systems. Now assume that a torque is exerted on the rotor of machine 12 in a given direction. The magnetic axis of the rotor will then no longer coincide with that of the stator whereby there will be a phase angle between the voltages of systems 10 and 11, and, therefore, energy will be transferred through machine 12 from one to the other of the two systems, for example from system 10 to system 11. The amount of energy transferred can be controlled by varying the amount of torque exerted on the rotor. Increasing the torque increases the phase angle between the voltages of the two systems and therefore increases the amount of energy transferred, whereas decreasing the torque decreases this phase angle and therefore decreases the amount of energy transferred. The same will be true when a torque is exerted on the rotor of machine 12 in the opposite direction, except that the machine will now transfer energy in the opposite direction, namely from system 11 to system 10. The above described control of the magnitude and direction of the energy transferred by machine 12 is also true when the rotor of machine 12 rotates at any speed in either direction due to the frequencies of systems 10 and 11 being different. Assuming that the voltages of the two systems remain substantially constant, it should be clear that in order to transfer a constant amount of energy through machine 12 from one to the other of the two systems irrespective of their relative frequencies, it is necessary to exert a constant torque in a given direction on the rotor of machine 12 irrespective of whether the rotor is stationary or rotates at any speed in either direction. This is accomplished by the simple, inexpensive and economically to operate control apparatus of my invention which will now be described in connection with Fig. 1.

I will first describe the operation of the apparatus shown in Fig. 1 with systems 10 and 11 having the same frequency. Thus, assume for example that systems 10 and 11 are now operating at 60 cycles. The rotor of machine 12 will therefore be stationary, hence armature 17 of machine 16 will also be stationary. Assume that contact arm 37 is at the center of resistance 38, and, therefore, no current is flowing through field winding 22 of machine 21. Now assume it is desired that machine 12 should not transfer any energy from one to the other of systems 10 and 11. This is accomplished by turning knurled nut 43 in the proper direction until pointer 45 indicates 0 on scale 46. At this position of the pointer the tension of spring 40 is just sufficient to hold core 28 in its normal position against the force of gravity without any magnetic force being exerted on the core. Contact arm 29 will therefore be in the illustrated position where it does not touch either of contacts 30 and 31. Armature 33 of motor 32 will therefore be stationary and contact arm 37 will remain at the center of resistance 38. No current will flow through winding 22 and substantially no voltage will be generated by rotating armature 23. No appreciable current will therefore flow through coil 25 of relay 26 and armature 17, hence the latter will exert a negligible torque on the rotor of machine 12 even if its field winding 18 is energized by having switch 19 closed. Since no appreciable torque is exerted in either direction on the rotor of machine 12 the latter does not transfer energy in either direction between systems 10 and 11.

Now assume it is desired that machine 12 should transfer 500 kw., from system 10 to system 11. Further assume that this requires that a torque of the proper magnitude should be exerted on the rotor of machine 12 in a clockwise direction facing its collector rings 13. This is accomplished by closing switch 19 to the right for example, and turning nut 43 in the proper direction until pointer 45 indicates 500 on scale 46. At this position of the pointer the tension of spring 40 is more than enough to hold core 28 in its normal position against the force of gravity without any magnetic force being exerted on the core. Core 28 will therefore be pulled upward and contact arm 29 will touch contact 30, thus effecting the energization of motor 32. The connections to motor 32 are so made that the latter will then rotate in such a direction that the resulting movement of contact arm 37 away from the center of resistance 38 will cause current to flow through field winding 22 in the proper direction whereby armature 23 will cause current to flow through armature 17 in that direction which, in combination with the current flowing through its field winding 18, will cause armature 17 to exert a torque on the rotor of machine 12 in a clockwise direction facing its collector rings 13. The current flowing through armature 17 also flows through coil 25 of solenoid 26, thus exerting a magnetic force on core 28 which tends to pull the latter downward against the tension of spring 40. Arm 29 therefore continues to touch contact 30 until the rotation of motor 32 has moved arm 37 sufficiently far from the center of resistance 38 to increase the current flowing through coil 25 to such a value that the downward magnetic pull on core 28 overcomes the upward pull thereon of spring 40 whereby arm 29 moves away from contact 30, thus stopping rotation of motor 32. I will assume for example that under this condition 5 amperes is flowing through coil 25, and that when this current is flowing through armature 17 the latter exerts the proper value of torque on the rotor of machine 12 in the direction mentioned so that the latter transfers 500 kw., from system 10 to system 11. By marking scale 46 so that under this condition pointer 45 indicates 500 on this scale, the pointer will indicate that this amount of energy is being transferred through machine 12. It should now be clear that by merely changing the tension of spring 40 by means of nut 43 any desired amount of energy can be transferred through machine 12 from system 10 to system 11, and that by suitably calibrating scale 46 the pointer 45 will indicate the amount of energy being transferred by machine 12. Furthermore, the same will be true when it is desired that machine 12 should transfer any given amount of energy from system 11 to system 10. Under this condition, however, it will be necessary that the torque exerted by armature 17 on the rotor of machine 12 should be in the opposite direction from that previously assumed, hence this torque should be exerted on the rotor of machine 12 in a counter-clockwise direction facing its collector rings 13. This is effected by having switch 19 closed to the left instead of to the right as previously assumed, hence causing the current to flow through field winding 18 in the opposite direction from that when machine 12 was transferring power from system 10 to system 11, thereby reversing the direction of the torque exerted by armature 17 on the rotor of machine 12.

I will now describe the operation of the apparatus shown in Fig. 1 when the frequency of either or both of systems 10 and 11 vary in any manner. First assume that systems 10 and 11 are operating at the same frequency, for example 60 cycles, that switch 19 is closed to the right and that pointer 45 indicates 500 on scale 46. The rotor of machine 12 and armature 17 are then stationary and the machine is transferring 500 kw., from system 10 to system 11, and, as previously assumed, 5 amperes are flowing through coil 25 and armatures 17 and 23. Now assume that the frequency of system 10 increases above 60 cycles, or that the frequency of system 11 decreases below 60 cycles, or that both occur. This causes the rotor of machine 12 to rotate in a given direction and at a speed dependent on the difference between the frequencies of the two systems as heretofore described. This, however, also causes armature 17 to rotate in a given direction, and I will assume that it rotates in a clockwise direction facing its commutator and that it generates a voltage which opposes that of armature 23. The immediate effect of this is to reduce the current flowing through coil 25 to some value below 5 amperes, hence the upward pull of spring 40 on core 28 will overcome the downward magnetic pull thereon and arm 29 will touch contact 30. This causes motor 32 to rotate in the proper direction to move contact arm 37 over resistance 38 so as to increase the current flowing through winding 22 and thereby increase the voltage generated by armature 23. When the voltage of armature 23 has been sufficiently increased so that in spite of the opposing voltage of armature 17 a current of 5 amperes is again flowing through coil 25, then the downward magnetic pull on core 28 overcomes the upward pull thereon of spring 40 and arm 29 moves away from contact 30, thus stopping rotation of motor 32. Since the current flowing through armature 17 is maintained at 5 amperes the torque exerted thereby on the rotor of machine 12 when it is rotating is the same as when it was stationary and the transfer of energy through the machine from system 10 to system 11 is therefore maintained at 500 kw., assuming of course that the voltages of the two systems remain substantially constant.

Now, instead of assuming that the frequency of system 10 increases above 60 cycles, or that of system 11 decreases below 60 cycles, or that both occur; assume that the frequency of system 10 decreases below 60 cycles, or that of system 11 increases above 60 cycles, or that both occur. This will cause the rotor of machine 12 to rotate in the opposite direction from that in which it previously rotated, and again it will rotate at a speed dependent on the difference between the frequencies of systems 10 and 11 as heretofore described. This will cause armature 17 to rotate in the opposite direction from that in which it previously rotated, hence now rotating in a counter-clockwise direction facing its commutator, and it will therefore now generate a voltage which is in the same direction as that of armature 23 when systems 10 and 11 had the same frequency. The immediate effect of this is to increase the current flowing through coil 25 to some value above 5 amperes, hence the downward magnetic pull on core 28 overcomes the upward pull thereon of spring 40 and arm 49 touches contact 31. This causes motor 32 to rotate in the proper direction to move contact arm 37 over resistance 38 so as to decrease the current flowing through winding 22 and thereby decrease the voltage generated by armature 23. When the voltage of armature 23 has been sufficiently decreased so that a current of 5 amperes is again flowing through coil 25, then, for reasons previously described, arm 29 moves away from contact 31, rotation of motor 32 is stopped, and machine 12 continues to transfer 500 kw., from system 10 to system 11. Furthermore, if armature 17 should rotate at such a speed that its voltage alone is more than sufficient to maintain a flow of 5 amperes through itself, coil 25 and armature 23, then the rotation of motor 32 will not only bring contact arm 37 from some position at one side of the center of resistance 38 to this center so that no current will flow through field winding 22, but will move arm 37 to the opposite side of the center of resistance 38. This will cause current to flow through field winding 22 in a direction opposite to that in which it previously flowed, thus reversing the voltage of armature 23 which will now oppose the voltage of armature 17. This movement of arm 37 will continue until the opposing voltage of armature 23 has been sufficiently increased so that a current of 5 amperes is again flowing through coil 25, and armatures 17 and 23. Then, for reasons previously described, arm 29 moves away from contact 31, rotation of motor 32 is stopped, and machine 12 continues to transfer 500 kw., from system 10 to system 11. The above described operation will also be true when switch 19 is closed to the left so that machine 12 transfers energy from system 11 to system 10. It is clear that any desired value of energy within the capacity of machine 12 can be transferred therethrough from one to the other of systems 10 and 11 by adjusting nut 43, and the control apparatus described will automatically maintain this value irrespective of variations in the frequency of either or both of the systems, assuming of course that the voltages of the two systems remain substantially constant. Furthermore, the control apparatus operates quickly, hence automatically maintaining the desired value of energy transfer even with fairly rapid changes in the frequency of either or both systems.

When machine 12 is transferring energy from system 10 to system 11, armature 17 is exerting a torque on the rotor of this machine in one direction, and when the machine is transferring energy from system 11 to system 10 the armature is exerting a torque on the rotor of this machine in the opposite direction. Armature 17 may, however, rotate in either direction under either of the above conditions, and may therefore operate either as a motor or as a generator under either of the above conditions. Thus, when armature 17 is rotating in the same direction as that of its torque machine 16 operates as a motor converting electrical energy into mechanical energy which is supplied to the rotor of machine 12, and it receives this electrical energy from machine 21 operating as a generator which is driven by machine 24 operating as a motor. When, however, armature 17 is rotating in a direction opposite to that of its torque machine 16 operates as a generator converting mechanical energy received from the rotor of machine 12 into electrical energy which it supplies to machine 21, the latter then operating as a motor driving machine 24 as an induction generator to feed this energy into system 11. Each of machines 16, 21 and 24 therefore operates as an energy translating device capable of transforming one form of energy into another. Although I have preferred to illustrate my invention in connection with electrical machines capable of performing this function, I wish it understood that my invention is not limited thereto.

With the proper relationship between the normal frequencies of systems 10 and 11 and the number of poles in the stator and rotor windings of machine 12, the rotor of the latter will be stationary when each system is operating at its normal frequency. For a given amount of energy transferred through machine 12 the amount of energy delivered to or by machine 16 depends on the magnitudes and directions of the frequency variations of the two systems from their normal values. These frequency variations are ordinarily small, and, therefore, the energy delivered to or by machine 16 is ordinarily a very small fraction of the power transferred through machine 12. For this reason it is possible to use a small and inexpensive solenoid 26 and simple, inexpensive apparatus controlled thereby for automatically maintaining a substantially constant predetermined value of energy flow through machine 12 from one to the other of systems 10 and 11 irrespective of variations in their relative frequencies.

As previously mentioned, the arrangement is ordinarily such that the rotor of machine 12 is stationary when systems 10 and 11 are operating at their normal frequencies, and the frequency variations of the two systems from their normal values are ordinarily small. The rotor of machine 12 will therefore either be stationary or operate at comparatively low speed. I have therefore shown a step-up gear arrangement between the rotor of machine 12 and armature 17 in order that the latter may operate at a much higher speed than the rotor of machine 12, thus permitting a more economical design of machine 16. However, my invention will also apply where armature 17 is directly coupled to the rotor of machine 12. I therefore wish it understood that wherever I have stated in the claims that the shaft of an energy translating device or a dynamo electric machine is mechanically coupled to the rotor of machine 12, I mean to include every form of torque transmitting mechanism therebetween, whether it be a direct connection of their shafts, gearing as shown, or otherwise.

The apparatus shown in Fig. 2 is similar to that shown in Fig. 1 except that machines 21 and 24 have been omitted and the two leads 27 that are connected to armature 23 of machine 21 in Fig. 1 are in Fig. 2 connected to rod 39 and the center of resistance 38. The apparatus shown in Fig. 2 operates in a similar manner to that described in connection with the apparatus shown in Fig. 1. The only exceptions are that in Fig. 2 machine 16 receives electrical energy directly from source 20 when it operates as a motor and supplies energy directly thereto when it operates as a generator, and solenoid 26 automatically controls the position of contact arm 37 on resistance 38 so as automatically to maintain a constant value of current through armature 17 from or to source 20 in order to maintain the energy flow through machine 12 at the adjusted value irrespective of the relative frequencies of systems 10 and 11. The apparatus shown in Fig. 2 has a lower first cost than that shown in Fig. 1, but, ordinarily, it is not so efficient in operation because all the current flowing through armature 17 must flow through a portion of resistance 38, thus ordinarily involving a greater loss of energy than that lost in machines 21 and 24 in Fig. 1. Furthermore, the apparatus shown in Fig. 1 possesses the advantage that its contact arm 37 has to handle a much lower current than that in Fig. 2.

In accordance with the provisions of the patent statutes, I have described the principles of operation of my invention, together with the apparatus which I now consider to represent the best embodiments thereof, but I desire to have it understood that the apparatus shown and described are only illustrative and that the invention may be carried out by other means.

What I claim as new and desire to secure by Letters Patent in the United States is:

1. A regulating arrangement for an induction frequency converter having stator and rotor winding elements respectively connected to two alternating current systems, said arrangement comprising energy translating means having a rotatable shaft mechanically coupled to the rotor element of the frequency converter for exerting a torque thereon, additional energy translating means operatively associated with the first-mentioned energy-translating means and capable of supplying energy thereto and of consuming energy supplied thereby, and means responsive to the energy flowing between said energy-translating means for automatically maintaining the torque exerted by the first-mentioned energy-translating means in a given direction on the rotor element of the frequency converter at a substantially constant value irrespective of the relative frequencies of the two alternating current systems.

2. A regulating arrangement for an induction frequency converter having stator and rotor winding elements respectively connected to two alternating current systems, said arrangement comprising a dynamo electric machine having its shaft mechanically coupled to the rotor element of the frequency converter for exerting a torque thereon, said dynamo electric machine having two relatively rotatable windings so arranged that energization thereof produces this torque, and means responsive to the current flowing in one of the relatively rotatable windings of said dynamo electric machine for automatically maintaining the torque exerted by the latter in a given direction on the rotor element of the frequency converter at a substantially constant value irrespective of the relative frequencies of the two alternating current systems.

3. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings arranged to be energized by direct current for producing this torque, and means responsive to the current flowing in said armature winding for automatically maintaining this flow of current at a substantially constant value in a given direction.

4. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings arranged to be energized by direct current for producing this torque, voltage producing means electrically connected to said armature winding, said voltage producing means being capable of supplying direct current at variable voltage to said armature winding and of consuming direct current at variable voltage supplied thereto by said armature winding, and means responsive to the current flowing in said armature winding for automatically varying the voltage of said voltage producing means so as to maintain this flow of current at a substantially constant value in a given direction.

5. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings arranged to be energized by direct current for producing this torque, another direct current dynamo electric machine having its armature winding electrically connected in series with the armature winding of the first-mentioned dynamo electric machine, means mechanically coupled to the second-mentioned dynamo electric machine capable of supplying mechanical energy thereto for driving it and of consuming mechanical energy when driven thereby, and means responsive to the current flowing in said armature windings for automatically varying the voltage of the second-mentioned dynamo electric machine so as to maintain this flow of current at a substantially constant value in a given direction.

6. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings, a second direct current dynamo electric machine having relatively rotatable field and armature windings, said field windings being arranged to be energized from a direct current source and said armature windings being electrically connected in series, a third dynamo electric machine mechanically coupled to the second-mentioned dynamo electric machine, and means responsive to the current flowing in said armature windings for automatically controlling the current flowing in the field winding of the second-mentioned dynamo electric machine so as to maintain a substantially constant value of current flowing in a given direction through the armature windings.

7. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having a rotatable armature winding and a stationary field winding arranged to be energized from a direct current source, a second dynamo electric machine having a stationary field winding and a rotatable armature winding electrically connected in series with the armature winding of the first-mentioned dynamo electric machine, a third dynamo electric machine mechanically coupled to the second-mentioned dynamo electric machine, a resistance arranged to be connected to a direct current source, a movable contact member adapted in different positions to make contact with different points of said resistance, means for respectively connecting the two ends of the field winding of the second-mentioned dynamo electric machine to a predetermined point on said resistance and to said contact member, and means responsive to the current flowing in said armature windings for automatically controlling the position of said contact member so as to maintain this flow of current at a substantially constant value in a given direction.

8. A regulating arrangement for an induction machine having stator and rotor winding elements, said arrangements comprising a direct current dynamo electric machine having its shaft mechanically coupled to the rotor element of the induction machine for exerting a torque thereon, said dynamo electric machine having a rotatable armature winding and a stationary field winding arranged to be energized from a direct current source, a second dynamo electric machine having a stationary field winding and a rotatable armature winding electrically connected in series with the armature winding of the first-mentioned dynamo electric machine, a third dynamo electric machine mechanically coupled to the second-mentioned dynamo electric machine, a resistance arranged to be connected to a direct current source, a movable contact member adapted in different positions to make contact with different points of said resistance, electroresponsive means for adjusting the position of said contact member, means for respectively connecting the two ends of the field winding of the second-mentioned dynamo electric machine to said contact member and to a point on said resistance intermediate the ends thereof, a solenoid having a movable magnetic core and a coil connected in series with said armature windings, adjustable means for exerting on said core a variable force in opposition to the magnetic force exerted thereon, a contact arm carried by said core, two spaced apart stationary contacts disposed on opposite sides of said contact arm, the arrangement being such that said contact arm can touch only one of said stationary contacts at a time, and means including said contact arm and stationary contacts for effecting the energization of said electroresponsive means so as to move said contact member in one direction when the contact arm touches one of the stationary contacts, and for effecting the energization of said electroresponsive means so as to move said contact member in the opposite direction when the contact arm touches the other stationary contact.

9. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings, said field winding being arranged to be energized from a direct current source, a resistance arranged for connection across a direct current source, a movable contact member adapted in different positions to make contact with different points of said resistance, means for connecting said armature winding across a predetermined point on said resistance and said contact member, and means responsive to the current flowing in said armature winding for automatically controlling the position of said contact member so as to maintain this flow of current at a substantially constant value in a given direction.

10. A regulating arrangement for an induction machine having stator and rotor winding elements, said arrangement comprising a direct current dynamo electric machine having its shaft mechanically coupled to the rotor element of the induction machine for exerting a torque thereon, said dynamo electric machine having relatively rotatable field and armature windings, said field winding being arranged to be energized from a direct current source, a resistance arranged for connection across a direct current source, a movable contact member adapted in different positions to make contact with different points of said resistance, electroresponsive means for adjusting the position of said contact member, means for connecting said armature winding across said contact member and a point on said resistance intermediate the ends thereof, a solenoid having a movable magnetic core and a coil connected in series with said armature winding, adjustable means for exerting on said core a variable force in opposition to the magnetic force exerted thereon, a contact arm carried by said core, two spaced apart stationary contacts disposed on opposite sides of said contact arm, the arrangement being such that said contact arm can touch only one of said stationary contacts at a time, and means including said contact arm and stationary contacts for effecting the energization of said electroresponsive means so as to move said contact member in one direction when the contact arm touches one of the stationary contacts, and for effecting the energization of said electroresponsive means so as to move said contact member in the opposite direction when the contact arm touches the other stationary contact.

11. In combination, an induction frequency converter having stator and rotor winding elements respectively connected to two alternating current systems, a dynamo electric machine having its shaft mechanically coupled to the rotor element of the frequency converter for exerting a torque thereon, said dynamo electric machine having two relatively rotatable windings each arranged to be connected to a voltage source, a solenoid having a stationary element and a movable element, one of said elements comprising a magnetic core and the other of said elements comprising a coil connected in series with one of the relatively rotatable windings of said dynamo electric machine, means for exerting on the movable element of said solenoid a force in opposition to the magnetic force exerted thereon, means for varying the magnitude of the voltage impressed on said one of the rotatable windings, and means controlled by the movable element of said solenoid for automatically controlling the operation of said voltage varying means so as to maintain a substantially constant value of current flowing in a given direction through said one of the rotatable windings.

12. In combination, an induction frequency converter having stator and rotor winding elements respectively connected to two alternating current systems, a direct current dynamo electric machine having its shaft mechanically coupled to the rotor element of the frequency converter for exerting a torque thereon, said dynamo electric machine having relatively rotatable field and armature windings arranged to be energized by direct current, a solenoid having a stationary element and a movable element, one of said elements comprising a magnetic core and the other of said elements comprising a coil connected in series with said armature winding, means for exerting on the movable element of said solenoid a force in opposition to the magnetic force exerted thereon, and means controlled by the movable element of said solenoid for automatically maintaining a substantially constant value of current flowing in a given direction through said armature winding.

13. In combination, an induction frequency converter having stator and rotor winding elements respectively connected to two alternating current systems, a direct current dynamo electric machine having its shaft mechanically coupled to the rotor element of the frequency converter for exerting a torque thereon, said dynamo electric machine having relatively rotatable field and armature windings each arranged to be connected to a direct current voltage source, means for controlling the magnitude and direction of the voltage impressed on said armature winding, a solenoid having a movable magnetic core and a stationary coil connected in series with said armature winding, adjustable means for exerting on said core a variable force in opposition to the magnetic force exerted thereon, a contact member carried by said core, two spaced apart stationary contacts disposed on opposite sides of said contact member, the arrangement being such that said contact member can touch only one of said stationary contacts at a time, and means including said contact member and stationary contacts for effecting the operation of said controlling means in response to the movement of the contact member so as to maintain a substantially constant value of current flowing through said armature winding in a given direction.

14. In combination, an induction frequency converter having stator and rotor winding elements respectively connected to two alternating current systems, a direct current dynamo electric machine having its shaft mechanically coupled to the rotor element of said frequency converter for exerting a torque thereon, said dynamo electric machine having a stationary field winding and a rotatable armature winding, a second direct current dynamo electric machine having a stationary field winding and a rotatable armature winding electrically connected in series with the armature winding of the first-mentioned dynamo electric machine, a third dynamo electric machine mechanically coupled to the second-mentioned dynamo electric machine and electrically connected to a source of current, a source of direct current, means for connecting the field winding of the first-mentioned dynamo electric machine across said direct current source, a resistance connected across said direct current source, a movable contact member adapted in different positions to make contact with different points of said resistance, means for respectively connecting the two ends of the field windings of the second-mentioned dynamo electric machine to said contact member and to a predetermined point on said resistance, a solenoid having a stationary element and a movable element, one of said elements comprising a magnetic core and the other of said elements comprising a coil connected in series with said armature windings, adjustable means for exerting on the movable element of said solenoid a variable force in opposition to the magnetic force exerted thereon, means controlled by the movable element of said solenoid for automatically controlling the position of said contact member so as to maintain a substantially constant value of current flowing in a given direction through said armature windings, and indicating means cooperating with said adjusting means, said indicating means being calibrated to indicate units of energy transferred through said frequency converter.

15. In combination, an asynchronous machine having a rotatable shaft and relatively rotatable primary and secondary windings, a dynamo electric machine having its shaft mechanically coupled to the shaft of said asynchronous machine for exerting a torque thereon, said dynamo electric machine having two relatively rotatable windings so arranged that energization thereof produces this torque, and means responsive to the current flowing in one of the relatively rotatable windings of said dynamo electric machine for automatically maintaining the torque exerted by the latter in a given direction on the shaft of said asynchronous machine at a substantially constant value irrespective of the speed of the asynchronous machine shaft.

16. An arrangement for exerting a substantially constant value of torque in a given direction on a rotating element driven at varying speed in either direction of rotation, said arrangement comprising a dynamo electric machine having its shaft mechanically coupled to the rotatable element for exerting a torque thereon, said dynamo electric machine having two relatively rotatable windings so arranged that energization thereof produces this torque, and means responsive to the current flowing in one of the relatively rotatable windings of said dynamo electric machine for automatically maintaining the torque exerted by the latter in a given direction on the rotatable element at a substantially constant value irrespective of the speed and direction of rotation of the rotatable element.

RAYMOND F. FRANKLIN.

CERTIFICATE OF CORRECTION.

Patent No. 1,961,039.  May 29, 1934.

RAYMOND F. FRANKLIN.

It is hereby certified that error appears in the printed specification of the above numbered patent requiring correction as follows: Page 2, line 149, for "resolve" read revolve; page 5, line 58, for "frenquency" read frequency; page 6, line 69, claim 6, for "record" read second; page 8, lines 16-17, claim 14, for "windings" read winding; and that the said Letters Patent should be read with these corrections therein that the same may conform to the record of the case in the Patent Office.

Signed and sealed this 24th day of July, A. D. 1934.

Bryan M. Battey (Seal)  Acting Commissioner of Patents.